United States Patent
Ballantyne

(10) Patent No.: US 6,693,869 B1
(45) Date of Patent: Feb. 17, 2004

(54) LOCATING INFORMATION ON AN OPTICAL MEDIA DISC TO MAXIMIZE THE RATE OF TRANSFER

(75) Inventor: Joseph C. Ballantyne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/282,582

(22) Filed: Mar. 31, 1999

(51) Int. Cl.[7] ................................................ G11B 7/28
(52) U.S. Cl. .................... 369/84; 369/47.12; 369/47.43
(58) Field of Search ........................ 369/275.3, 53.24, 369/53.2, 30.19, 44.11, 275.4, 47.1, 84, 47.12, 44.32, 124.14, 53.41, 47.43

(56) References Cited

U.S. PATENT DOCUMENTS

| | | | |
|---|---|---|---|
| 4,985,784 A | 1/1991 | Tsuboi et al. ................ | 386/109 |
| 5,394,382 A | 2/1995 | Hu et al. .................. | 369/30.19 |
| 5,528,574 A | 6/1996 | Takeuchi et al. ........... | 369/47.4 |
| 5,633,472 A | 5/1997 | DeWitt et al. ................ | 84/602 |
| 5,668,996 A | 9/1997 | Radinsky .................... | 709/322 |
| 5,687,148 A | 11/1997 | Uemura ................... | 369/47.41 |
| 5,703,850 A | 12/1997 | Wada ....................... | 369/47.21 |
| 5,790,512 A * | 8/1998 | Put et al. .................... | 369/116 |
| 5,831,950 A | 11/1998 | Furukawa ................ | 369/53.31 |
| 5,896,364 A * | 4/1999 | Okazaki et al. .......... | 369/275.3 |
| 6,160,776 A * | 12/2000 | Seo .......................... | 369/275.4 |
| 6,215,747 B1 * | 4/2001 | Jobs .......................... | 369/53.2 |

FOREIGN PATENT DOCUMENTS

| | | |
|---|---|---|
| EP | 0 418 858 | 3/1991 |
| EP | 0 738 081 | 10/1996 |
| EP | 0 837 469 | 4/1998 |
| JP | 08212708 | 8/1996 |

* cited by examiner

Primary Examiner—William Korzuch
Assistant Examiner—Kim-Kwok Chu
(74) Attorney, Agent, or Firm—Klarquist Sparkman, LLP

(57) ABSTRACT

A user-interactive program assists a user in locating files on optical media discs such as CD-ROMs and DVDs to enhance file-transfer rates and program installation times in computers with a Constant Angular Velocity (CAV) optical media disc drive. In addition, an application program calculates an optimal location for files and/or directories on an optical media disc so that the files are located near the location with the highest data transfer rate. This program may be used to compute an image file that defines where data will be located on an optical disc, or may be used to control transfer of data to the optical media disc.

23 Claims, 8 Drawing Sheets

LOCATING INFORMATION ON AN OPTICAL MEDIA DISC TO MAXIMIZE THE RATE OF TRANSFER

FIELD OF THE INVENTION

The invention pertains to storing data on computer-readable optical media discs.

BACKGROUND OF THE INVENTION

Computer-readable optical media discs are used to store data in a digital form that can be readily retrieved from the disc by an appropriate disc reading device. These discs include CD-ROMS (Compact Disc Read Only Memory), rewritable CDs, and DVDs (Digital Versatile Discs). DVDs are functionally similar to CDs, except that a single sided DVD can store about 4.3 gigabytes of data in comparison to the 680 megabyte storage capacity of a CD. For simplicity, the following will generally discuss compact discs. The principles also apply to single and double sided DVDs as well.

CDDA (Compact Disc Digital Audio) discs were the first optical media discs to store digital data. They are commonly known as Compact Discs or CDs. They were originally developed to store audio content, and have become the de facto standard for such, replacing phonographic records. The widespread success of CDs led to the development of CD-ROMs, which have become a standard medium for storing computer-readable information. CD-ROMs are read by equipment called CD-ROM drives. Modern CD-ROM drives and associated computer hardware and software drivers enable today's computers to read data, audio, and video information from CDs.

Information content is stored on a CD in a binary format comprising a sequence of on and off bits. A CD is made from a polycarbonate disc that has a specially treated reflective surface that is encoded with a pattern of "pitted" and "non-pitted" areas. These pitted and non-pitted areas are formed along a continuous spiral that starts from near the inner edge of the disc, extending outward toward the outer edge of the disc, much like the single groove on a phonographic record. A tracking laser and photosensor head (read-head) are controllably situated above the spiral grove as the compact disc is rotated on a platter by a motorized device so as to read the binary pattern formed by the pitted and non-pitted areas. When the laser falls upon a pitted area the laser light is reflected in such a way that the amount of light detected at the photosensor is vastly reduced from the amount of light detected at the photosensor when the laser light reflects from a non pitted area. As the CD is rotated and the spiral of pits passes underneath the read-head, the photosensor and associated electronics convert this variation in detected light intensity into a stream of digital bits or logical ones and zeros. After further processing by error detection and correction circuitry, the stream of bits is converted into a stream of output data bytes. These data bytes can be PCM audio data, computer file system data, or other digital data. These data bytes can be read in chunks called blocks or sectors by a computer. The rate at which the data on a CD can be read is called the transfer rate.

When CD technology was originally developed, engineers had to determine the density limitations of the pitted pattern inscribed on the CD so as to meet playback accuracy and manufacturing needs based on the existing technology at the time. A density of about 150 megabytes per square inch was the result of the original CD standards produced in the early 1980's. The CD standards prescribe the dimensions and tolerances for the pit width, depth, and length, as well as the track pitch (how far the pit spiral advances towards the outside of the disc for each revolution of the disc). The first CD standard described CDDA specifications and became known as the Redbook, since the color of the book containing the standard was red. Succeeding standards regarding CDs are called Yellow Book, Orange Book, etc. The Redbook standard specifies a standard track pitch of 1.6 micrometers, pit width of 0.6 micrometers and the minimum pit length of 0.83 micrometers.

Since the original CD equipment was designed for the reproduction of audio content, it was the objective of the engineers to develop a means for accurately reproducing the audio content for real-time playback. The sample rate of CDDA digital audio is a constant 44.1 kHz for the duration of all recordings. Therefore, the playback method which minimizes the amount of storage required in the playback device, while still maximizing the storage capacity of the digital storage medium by maintaining a constant storage density across the disc, is one in which the disc is spun at a varying speed so as to maintain a constant bitrate independent of the location of the photosensor along the pit spiral. The original CD players were designed in this way. As the read head of the CD moves out along the pit-spiral towards the outside of the disc, the player slows the motor spinning the disc. The player thus maintains a constant bitrate just sufficient to reproduce the digital audio samples at the 44.1 kHz rate at which they are being consumed by the DACs in the player. A CD audio player maintains a constant linear velocity of about 1.2 meters per second. In order to maintain this constant linear velocity a CD player spins the CD at about 400 RPM when the read-head is close to the inner edge disc, and slows the CD to about 200 RPM as the read-head reaches the outer edge of the disc.

The first generation CD-ROM drive design was based on the audio CD player design and thus CD-ROMs inherited this constant linear read-head velocity design. This type of CD-ROM drive is known as a Constant Linear Velocity or CLV CD-ROM drive. With a CLV CD-ROM drive the data transfer rate is the same regardless of where the data on the CD resides.

When a CD-ROM drive is used to retrieve digitally stored data from a CD-ROM there is no requirement that the data be transferred at the same rate as the original audio CD players. Rather, the objective is to transfer the data as fast as possible, while still maintaining accuracy. Advancement in lasers, photosensors, read-head equipment, and processing circuitry has enabled newer drives to accurately read data at much higher linear velocities then the original drives. These CDROM drives are classified by their maximum data transfer rate capability relative to the original drives, e.g., 2x, 4x, 8x, 12x (representing 12 times the original data transfer rate of 153,600 bytes per second), 24x, etc.

Another performance consideration is access time, also commonly referred to as seek time. Seek time is the time it takes to move from one data location on a disc to another data location on the disc. Listed seek times are generally a weighted average of seek times, and they give some indication of what the average seek time will be under typical use. Because the optical read-head of a CD drive is substantially more massive than the flyweight mechanism of hard discs, it takes significantly more time to precisely move the read-head to a new position. Furthermore, if the radial position (on the CD) of the new data to be read is a fair distance away from the present position of the read-head, an additional wait will be required to adjust the speed of the CD drive motor. Since the linear velocity under the read-head must be maintained at a constant rate in a CLV drive, any change in the radial position of the read-head requires a change in the speed of the motor. Since the inertia of the motor, platter, and CD is relatively large in comparison to the motor torque, it takes some time to change the speed of the motor, especially when moving from the inside of the CD to the outside or vice-versa.

CD-ROM drive manufacturers are constantly striving to reduce their manufacturing costs, increase drive performance, and increase drive reliability. While CLV drives work well for audio playback, their design is not optimized for minimum manufacturing costs, maximum reliability, and optimal data transfer rates. Because the speed of the motor must be constantly varied to obtain a constant read-head linear velocity, it is necessary to have more expensive motors and control circuitry than would be required if the motor could be spun at a single constant speed. This additional complexity and the constantly changing motor speed also leads to decreased drive reliability. In addition, the required change in motor speed leads to increased seek times.

In order to overcome these drawbacks, a new type of CD-ROM drive has recently been introduced. The advancements in technology discussed above have facilitated the development of CD-ROM drives that can read data at variable read-head linear velocities. These new drives are called Constant Angular Velocity or CAV CD-ROM drives. In a CAV CD-ROM drive the motor spins the disc platter at a constant angular velocity (i.e., a constant R.P.M). Since the CD is spun at a constant velocity, the linear velocity at which data passes under the read-head is proportional to the radial position of the read-head relative to the center of the disc. This means that for any given RPM, these new drives will have higher linear read-head velocities and therefore higher data transfer rates for read-head positions which are closer to the outside of the CD-ROM. CAV drives also have lower seek times than CLV drives during large read-head position changes since the drive motor speed does not have to change. Current generation CAV CD-ROM drives have seek times of about 100ms. This is a significant improvement over older CLV drives.

It is important to note that the data transfer rate of the new CAV drives does not necessarily increase linearly as the drive-head moves to the outside of the disc. If the hole in the center of the CD-ROM is not well centered relative to the pit spiral on the disc, then the read-head tracking circuitry in some drives is not able to properly track the spiral as the read-head moves towards the outside of the disc. To compensate for this, some drives will switch back to CLV mode, or will reduce the speed at which they are spinning the motor in order to be able to better read the data on the outside of the disc. In addition, some CD-ROM discs are not well balanced and some drives are not capable of spinning them at the highest speed possible because the forces generated by an unbalanced disc increase with the speed at which a disc is spun.

SUMMARY OF THE INVENTION

The invention enhances the data transfer rate of files stored on computer-readable optical media discs when using a CAV (Constant Angular Velocity) drive by locating the files on disc to take advantage of the higher linear read-head velocities toward the outer portion of a disc.

One aspect of the invention is a computer-assisted method for optimally locating files on an optical media disc such as a CD-ROM. A user-interactive computer program assists a user in selectively locating files and/or directories on the CD-ROM. In a first step, a destination file hierarchy image, representative of a file structure that will exist once the files are transferred from the CD-ROM to a fixed-media destination drive, such as a local hard drive, is built. The destination file hierarchy image typically comprises one or more computer programs and associated data, including audio and video data. Files from the destination file hierarchy image can be interactively selected by a user to build a CD-ROM file order list. The user can select specific files and/or directories to be located on the CD-ROM so that they can be accessed at a higher data transfer rate then the non-selected files. A CD-image file, which is a single file comprising the program and data files in the selected order, is then built from the CD-ROM file order list. The specifically selected files are written into the CD-image file so that they are placed at the end of the CD-image file. In an alternative method, a computer can be programmed to arrange the order of the files in the CD-image file automatically by file-type, or other pre-selected criteria. The CD-image file is then transferred to (e.g., burned into) a master CD. When transferring a CD-image file to a master CD, the image file is written from the inside of the CD toward the outside in a continuous spiral. By locating the selectable files at the end of the CD-image file, these files are the last files transferred to the master CD, and are thus located toward the outer portion of the master CD. Once the CD-image file has been transferred to a master CD, duplicate CDs can be manufactured from the master CD for commercial distribution and use.

An installation program is created that can be run by a computer to install the files from the CD-ROM to a destination drive, such as a hard drive. The installation program includes a table that contains directions for installing the files from the CD-ROM so that when the files are installed to the destination drive the file structure created matches the destination file hierarchy image.

In one implementation of the invention, a "dummy" file is used to locate files toward the outer portion of a CD-ROM. The dummy file contains no program-usable data, and is used to take up.data storage space located toward the inner portion of the CD-ROM. In a typical case, a cumulative storage size required to store all of the files that are to be installed on a CD-ROM is calculated, along with a overhead storage size based on several parameters, including the operation mode of the CD-ROM, the number of files and directories, etc. An optimum dummy file size can then be calculated by subtracting the cumulative and overhead storage sizes from a known overall storage capacity of a target CD-ROM format. The dummy file can either be burned directly into a master CD, or added to a CD-image file at the start of the file.

A dummy file is not required to locate files optimally on an optical media disc. Calculations similar to those for computing the size of the dummy file may be used to find an optimal disc location parameter indicating where useful data should be located on the optical media disc. For example, this parameter may represent the point on the optical media disc separating unused storage space on the inner portion of the disc and space for storing useful data on the outer portion of the disc. One application of this parameter is a software program for controlling the transfer of files to an optical media disc. In such an application, the software program would use the optimal location parameter to determine where to locate the files on the optical media disc to optimize the read time of these files from the disc. Another application is in a program for creating of an image file specifying where files are to be located on the optical media disc.

In certain optical media disc drives, the outer edge of the disc may not provide the highest data transfer rate. Thus, while the maximum data transfer rate is generally at the outer portion of the disc, it is preferable in some cases not to transfer data for which the highest data transfer rate is desired to the very outside of the disc. The location of the maximum expected transfer rate may be calculated using a statistical analysis of data transfer rates of optical media drives from a single or multiple manufacturers. The location of the expected maximum data transfer rate can then be used in determining how to organize files for transfer onto the optical media disc. For example, the optimal location parameter and dummy file size may be adjusted so that selected data is located at or near the location of the maximum data transfer rate.

In another implementation of the invention, a user-interactive computer program that presents a graphical user-interface in a windowing environment is provided. The computer program responds to user inputs to allow the user to selectively locate files on a CD-ROM. The user-interface comprises multiple window panes so the user can simultaneously view a variety of data, including the optical media file hierarchy tree pane, a file detail pane, an image file order list pane, and a statistics pane. Files and/or directories can be selected and dragged from the fixed-media file hierarchy tree to create a file hierarchy tree in the image file order list pane. Once a file hierarchy tree is built in the CD destination file pane, it can be rearranged by selecting and dragging files and/or directories from within the pane. Alternately, the file hierarchy tree can be directly loaded into the CD destination file pane from a pre-existing file hierarchy. A graphical representation of the location of the files as they are to be stored on a master CD is available in an optional multi-window user-interface. The files and directories can be rearranged by selecting rings on the graphical CD and dragging them to new locations. As the CD destination file hierarchy tree is being constructed, data in the statistics pane is interactively updated. This data includes estimated times to install the files on the CD to a fixed-media drive using various CAV and CLV CD-ROM drives.

While the invention is described with multiple exemplary implementations pertaining to CD-ROMs, it is equally applicable to DVDs (Digital Versatile Discs), and any optical media discs that can be read with CAV drive equipment.

DETAILED DESCRIPTION

The invention is directed to a method for locating files on a CD-ROM or other computer-readable optical media discs to reduce the installation time and improve the transfer rate of program files on a computer that uses a constant angular velocity (CAV) drive. Since many, if not most, new computer applications are shipped on CD-ROMs or other optical media, it is desirable to minimize the time the user must wait while the program files are installed from the optical media to the computer hard disc or other storage medium. In many instances several hundred megabytes of data may have to be installed during the installation process. Furthermore, it is typical for many games and other graphical-oriented applications to install only some files on the hard disc, while leaving the bulk of application data to be retrieved from a CD-ROM during program usage. The invention can be used to optimize the location of both the data to be installed and non-installed read-only data so as to optimize data transfer rates during program installation and program usage.

Exemplary Operating Environment

Figure 1:
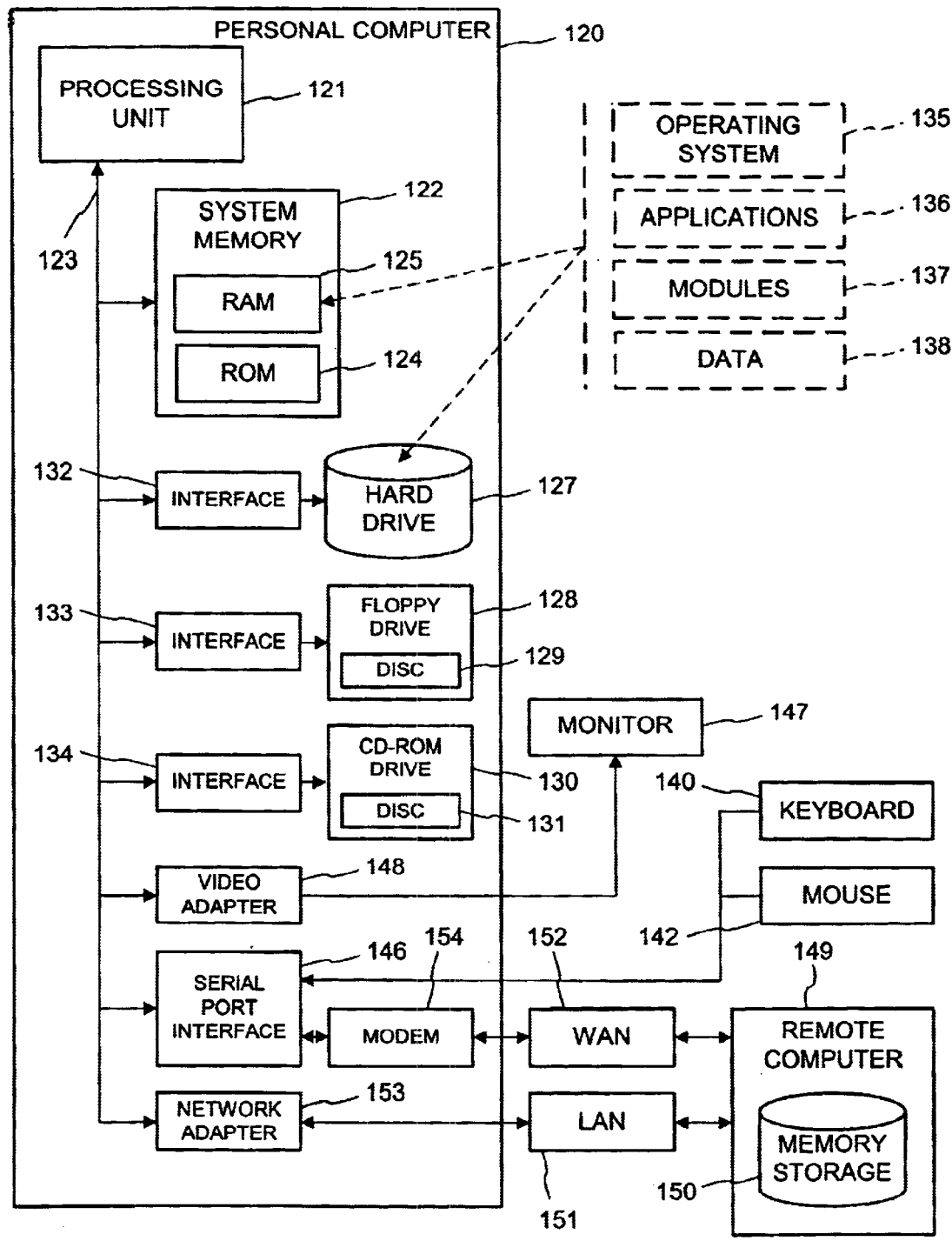
FIG. 1 is a diagram showing a general computing environment that can be used to practice the invention.

FIG. 1 and the following discussion are intended to provide a brief, general description of a suitable computing environment in which the invention may be implemented. The invention may be implemented in program modules comprising executable instructions that run on a computer.

Generally, program modules include routines, programs, components, data structures, etc. that perform particular tasks or implement particular abstract data types. The invention may be ported to other computer system configurations, including multiprocessor systems, microprocessor-based or programmable consumer electronics, minicomputers, mainframe computers, and the like. The invention may also be implemented in distributed computing environments where tasks are performed by remote processing devices that are linked through a communications network. In a distributed computing environment, program modules may be located in both local and remote memory storage devices.

FIG. 1 illustrates an example of a computer system that serves as an operating environment for the invention. The computer system includes a personal computer 120, including a processing unit 121, a system memory 122, and a system bus 123 that interconnects various system components including the system memory to the processing unit 121.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 further includes a hard disc drive 127, a magnetic disc drive 128, e.g., to read from or write to a removable disc 129, and an optical disc drive 130, e.g., for reading a CD-ROM disc 131 or to read from or write to other optical media. The hard disc drive 127, magnetic disc drive 128, and optical disc drive 130 are connected to the system bus 123 by a hard disc drive interface 132, a magnetic disc drive interface 133, and an optical drive interface 134, respectively. The drives and their associated computer-readable media provide nonvolatile storage of data, data structures, computer-executable instructions (program code such as dynamic link libraries, and executable files), etc. for the personal computer 120.

Although the description of computer-readable media above refers to a hard disc, a removable magnetic disc and a CD, it can also include other types of media that are readable by a computer, such as magnetic cassettes, flash memory cards, digital video discs, Bernoulli cartridges, and the like.

A number of program modules may be stored in the drives and RAM 125, including an operating system 135, one or more application programs 136, other program modules 137, and program data 138.

A user may enter commands and information into the personal computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB).

A monitor 147 or other type of display device is also connected to the system bus 123 via an interface, such as a video adapter 148. In addition to the monitor, personal computers typically include other peripheral output devices (not shown), such as speakers and printers.

The personal computer 120 operates in a networked environment using logical connections to one or more remote computers, such as a remote computer 149. The remote computer 149 may be a server, a router, a peer device or other common network node, and typically includes many or all of the elements described relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 54 or other means for establishing communications over the wide area network 152, such as the Internet. The modem 154, which may be internal or external, is connected to the system bus 123 via the serial port interface 146.

In a networked environment, program modules depicted relative to the personal computer 120, or portions of them, may be stored in the remote memory storage device. It will be appreciated that the network connections shown are exemplary and that other means of establishing a communications link between the computers may be used.

Basic Format of a CD-ROM

The information on all CDs starts at the center and progresses in an outward spiral on the disc. The CD divides its capacity into short segments called sectors. These sectors are also called large frames and are the basic unit of addressing. Large frames define the physical format of a Compact Disc and are defined by the CD-ROM media standards to contain 2352. The CD-ROM media standards allow for several data formats within each large frame, dependent on the application for which the CD-ROM is meant. In simple data storage applications, data mode one, 2048 bytes in a 2352-byte large frame actually store data. The remaining 304 are divided among a synchronization field (12 bytes), sector address tag field (4 bytes), and auxiliary field (288 bytes).

Sectors are grouped into tracks which are akin to the individual tracks on a phonographic record. A single CD is organized as one of up to 99 tracks. Although a single CD can accommodate a mix of audio, video, and digital data, each track must be purely one of the three. The tracks on a disc are contiguous and sequentially numbered. Each track consists of at least 300 large frames. Part of each track is a transition area called pre-gap and post-gap areas (for data discs) or pause areas (for audio discs). The data on the disc begins with a Table of Contents, which is located before track 1 on the disc. It occupies the pre-gap area.

Recording Compact Discs

Compact Discs are recorded by spinning a specially-prepared recordable (CD-R) disc while controllably directing a laser upon the disc's surface so as to produce pitted and non-pitted areas. The CD-R disc comprises a polycarbonate substrate that has a spiral groove physically stamped into it. This groove incorporates sector formatting data which defines the capacity of the disc. CD-R discs are preferably recorded in a sequential file writing sequence so that the CD recorder receives and writes data in a continuous stream. In most CD recorders, the stream of data cannot be interrupted once it starts. The CD is recorded from its innermost portion toward the outside of the disc.

CD's are recorded in sessions. A session is a single recorded segment on a CD, which may comprise multiple tracks. Under the Orange Book standard (the official standard for recordable CD systems), a multi-session disc can contain blocks of data written at different times (sessions). Each session provides a lead-in on the disc, which provides for a table of contents for the session. The lead-in length is fixed at 5400 sectors, equivalent to one minute of audio, or 9 MB of data. At the end of a session, a lead-out is written on the disc, which contains no data but only signals to the CD player or drive that it has reached the end of the active data area. The first lead-out on a CD measures 6750 sectors long, the equivalent of 1.5 minutes of audio, or 13 MB of data. Any subsequent lead-outs on a single disc last for 2250 sectors, half a minute, or 4 MB of data.

There are two methods for copying data to the CD. One method is to create a CD image file on a hard disc, and then copy the image intact to the CD. From a hardware standpoint, this is the easiest method, because the disc image is already in the form of a single huge file with all of the directory structures needed for the final CD in their proper places. The system only needs to read the hard disc and send a steady stream of data to the CD recorder. The alternative method is to create the CD structure in its final form on the CD itself, sometimes called "writing a virtual image." In this instance the CD recorder software must follow a script or database to find which files it should included on the disc and locate the files on the hard disc. The program must allocate the space on the CD, dividing it into sectors and tracks, while at the same time reading the hard disc and transferring the data to the CD.

CD-R Capacities for Common Data Formats

Two kinds of file overhead affect the number of bytes available on a given recordable CD that can actually be used for storage. One results from the need to allocate data in fixed-sized blocks. The other results from the format structure required by the CD standards. Table 1 contains CD-R capacities that reflect the effect of this overhead on CD-R capacity.

TABLE 1

|  | Audio | Mode 1 | Mode 2 | XA Form 1 | XA Form 2 |
| --- | --- | --- | --- | --- | --- |
| Block Size | 2352 bytes | 2048 bytes | 2336 bytes | 2048 bytes | 2324 bytes |
| 18 Min | 190,512K | 165,888K | 189,216K | 165,888K | 188,244K |
| 21 Min | 222,264K | 193,536K | 220,752K | 193,536K | 219,618K |
| 63 Min | 666,792K | 580,608K | 662,256K | 580,608K | 658,854K |
| 74 Min | 783,216K | 681,984K | 777,888K | 681,984K | 773,892K |

The Yellow Book describes how to put information on a CD-ROM. However, it does not define how to organize the data into files. The current standard for computers using DOS and WINDOWS® operating systems is the ISO 9660 specification. The ISO 9660 file structure reserves the first 16 sectors of the data area (32,768) bytes for system use. The root file, primary volume descriptor, and volume descriptor set terminator require a minimum of one sector each. The path tables require at least two sectors. These required elements consequently take another five sectors or 10,120 bytes of space. Each session for making a CD requires at least 13 MB of space in addition to the file structure overhead.

Locating Files on a Master CD

Most CD-ROMs are not CD-R discs, but rather are permanently encoded discs manufactured from a master CD. The master CD is encoded by "burning" a pattern in a specially-made polycarbonate disc that is similar to a CD-R disc. A pattern can be formed from the master CD to manufacture mass quantities of duplicate read-only CDs using a precision molding process.

Data is burned into the master CD in a spiral pattern from the center of the CD towards its outside. In a conventional master CD burning process the data files and audio/video data that are burned into the disc is located on the disc immediately after the pre-gap area. In contrast, in one of the implementations of this invention, the data files and audio/video data are burned into the disc toward its outer portion. This can be accomplished in several different ways: either by using a dummy file, or by setting up the directory structure so the files are simply placed on the outside of the disk, and the unused section of the disk is filled with unused data, or by using multiple sessions and placing the data in a session that is located toward the outside of the disk.

The dummy file is a file that is burned into the CD ROM towards the inside of the CD so that the other files that are to be installed on the CD are later burned toward the outside of the CD. The dummy file does not contain any data that will be installed to the computer's hard disc drive or used by an application program that requires access to data from a CD during the program's usage. Its purpose is to displace the location of the usable data towards the outermost portion of the CD. To insure that the data files and audio data are burned into the outermost portion of the master CD, it is necessary that the size of the dummy file be accurately calculated.

In some applications, it may not be necessary to use a dummy file to locate data optimally on a disc. For example, the directory structure may be setup so that the files containing useful data are directly located on the outer portion of the disc, leaving the remaining inner portion unused. In this case, the same calculations used to calculate the size of the dummy file may be used to compute an optimal location parameter, indicating the region where useful data should reside on the disc. This parameter may be defined so that it indicates the point on the disc separating useful data on the outer portion of the disc, and unused space on the inner portion of the disc. It may also be defined as the location of the maximum expected data transfer rate on the disc.

In many applications, the objective of locating files on an optical media disc is to transfer certain designated data (e.g., program files or data) to locations that are expected to have higher expected data transfer rates than other areas. In some cases, it is not critical that the designated data be located at the location of the maximum expected data transfer rate. Instead, it is sufficient that the designated data has a higher transfer rate than un-designated data or unused portions of the disc.

The use of the optimal location parameter is applicable to the process of computing the optical disc image as well as the process for controlling the transfer of data to the optical disc. In both cases, the parameter indicates where the useful or specifically designated data should be located on the optical disc relative to other data or unused portions on the disc. The parameter may be adjusted in cases where the maximum expected data transfer rate is not at the outer edge of the disc. For example, the parameter may be adjusted by an offset so that files with the highest desired data transfer rate are positioned inside the outer edge of the disc at or near the location of the maximum expected data transfer rate.

Calculating the Dummy File Size

As with most hard and floppy discs, CD-ROMS allocate their storage in increments called logical blocks (sectors). Although logical block sizes of 512, 1024, and 2048 bytes are possible with today's CD drives, only 2048-byte logical block format is in wide use. If a file is smaller than a logical block, it is padded out to fill a logical block. If a file is larger than one logical block, it fills all its logical blocks except the last, which is then padded out to be completely filled. As a result of this allocation method, all files except those that are an exact multiple of the logical block size require more disc space than their actual size. In addition, all directories on a CD require at least one logical block of storage.

To calculate the size of the dummy file it is necessary to determine the number of logical blocks (sectors) used by all of the other files (and audio and/or video data if the CD-ROM is to have mixed data on it) that are to be put on the CD. Since the smallest addressable unit on the CD is a sector, the overall number of sectors used is the key calculation, rather than the cumulative file size in bytes. Equation I can be used to calculate the number of sectors per file:

$$\#\text{Sectors/File} = INT\left(\frac{(\text{File Size(bytes)}) + (\text{Sector Size} - 1))}{\text{Sector Size}}\right) \quad (1)$$

where INT( ) is the Integer value of the resultant.

For example, if the file size is 236,000 bytes and the sector size is 2048 bytes then the number of sectors used is INT((236,000+2047)/2048 )=116 sectors.

Equation 2 is then used to calculate the cumulative number of sectors used by the files and any associated directories:

$$\text{Total \# Sectors} = \sum_{File1}^{FileN} \text{\# Sectors/File} + \text{\# Sectors in Directory} \qquad (2)$$

The space available for storing files can be calculated by knowing several of the parameters that were used to make the Compact Disc. For example, suppose that a 74 minute CD-ROM disc is used in Mode 1. The starting capacity is 681,984,000 bytes, or 330,000 sectors. From this starting capacity we remove 32,768 bytes (16 sectors) for system use, and at least 10,120 bytes (5 sectors) for other overhead. We must also remove 4500 sectors for the first recording session lead-in and 2250 sectors for the first session lead out. Thus, we are left with 326,229 sectors available for file storage on the CD.

Considerations for Mixed-Mode CDs

When mixed file data and audio/video data are contained on a single CD there needs to be allowance for the additional overhead. The Yellow Book, as discussed above, describes the data format standards for CD-ROM discs, and includes CD-XA, which adds compressed audio (and/or video) information to other CD-ROM data. This data is divided into two modes: Mode 1, for ordinary computer data, and Mode 2 for compressed audio and video data. This standard is now recognized as an international standard under ISO 10149:1989(E).

Exemplary Implementation 1

As discussed above, in order to optimize the transfer rate for CD-ROMs used in CAV drives the files to be transferred must be located towards the outer portions of the CD. Oftentimes, in multimedia applications the program will access specific files more frequently than others from a CD during program usage. In other cases, a program or operating system and various accessory files may be installed from a CD, with some of the accessory files being optionally installed. In both of these instances, it is desired that the most frequently accessed and/or installed files be located toward the outermost portion of the master CD and thus the subsequent duplicate CDs shipped to the consumer user.

An example application program will be used to illustrate how files could be selectively located on a CD. This application program is used to teach cooking. The user selects the type of food she would like to learn how to prepare from various categories, and the program displays a multimedia video based on a professional chef preparing the same food.

Below is a typical file image directory structure after the application program and accessory files have been installed to a local hard drive.

C:\PROCHEF\CHEF.EXE
C:\PROCHEF\DISPLAY.DLL
C:\PROCHEF\RECIPE.DLL
C:\PROCHEF\SETUP.EXE
C:\PROCHEF\APPETIZER\MEATS\FISH\COD.DAT
C:\PROCHEF\BREADS\YEAST\FRENCH.DAT
C:\PROCHEF\BREADS\YEAST\SOURDOUGH.DAT
C:\PROCHEF\FRUITS\BERRIES\BLACKBERRY.DAT
C:\PROCHEF\FRUITS\BERRIES\RASPBERRY.DAT
C:\PROCHEF\FRUITS\BERRIES\STRAWBERRY.DAT
C:\PROCHEF\VEGETABLES\CARROT.DAT
C:\PROCHEF\VEGETABLES\POTATO.DAT
C:\PROCHEF\VEGETABLES\SQUASH.DAT
List 1

The files in this directory structure are sequentially listed alphabetically by directory or subdirectory name and then by file name. Conversely, another method for ordering files on a CD-ROM is to order the files first by depth in the directory tree, and secondarily alphabetically. This ensures that files in the same directory are together on the destination storage device, e.g., the computer's hard disc. This reduces seek times if a program accesses files that are all in the same directory. For example, following this standard scheme the above files structure would be physically located on a master CD in the following order:

D:\CHEF.EXE
D:\DISPLAY.DLL
D:\RECIPE.DLL
D:\SETUP.EXE
D:\VEGETABLES\CARROT.DAT
D:\VEGETABLES\POTATO.DAT
D:\VEGETABLES\SQUASH.DAT
D:\BREADS\YEAST\FRENCH.DAT
D:\BREADS\YEAST\SOURDOUGH.DAT
D:\FRUITS\BERRIES\BLACKBERRY.DAT
D:\FRUITS\BERRIES\RASPBERRY.DAT
D:\FRUITS\BERRIES\STRAWBERRY.DAT
D:\APPETIZER\MEATS\FISH\COD.DAT
D:\APPETIZER\MEATS\FISH\SALMON.DAT
List 2

An installation (setup.exe) program would be run from the CD and it would contain directions for installing the files on the hard drive. It is possible that one or more of the files could be stored on the CD in a compressed file such as a zip or cab file, and part of the installation would include extracting the files from the compressed file. In this case it would be desirable to locate the compressed file toward the outside of the CD. Note that the "PROCHEF" directory has been added to the directory structure for all the files in List 1—this subdirectory would not be necessary for locating the files on the CD, but could be added during the installation process automatically, or the user could select a directory to locate the application program in.

Since multimedia files tend to be very large, it may be likely that the user would prefer not to install these files on her hard disc, but would rather read them off of the CD ROM when their use was required by the application. It also is likely that on average certain food video files would be accessed more often than others by users as a whole, or that certain videos might have higher resolution and therefore require higher data transfer rates. For instance, a focus group might find that the users of this program preferred to either permanently install the VEGETABLE files on their hard drives, or access these files more frequently from the CD than the other videos when using the application. Alternatively, a file-usage monitor could be written into a version of the program that is distributed to a statistically significant number of users, wherein the monitor could compile information concerning how often the various files are accessed during program usage. The information from the various users could then be used to compute a statistical analysis of relative file access, and this statistical information could then be used to locate the files that are accessed most frequently toward the outer portion of the CD for the final or next release version of the program.

Assuming that the results of the focus group or the statistical analysis indicate that the VEGETABLE files are the most-frequently installed and/or accessed files, it is desired to install and/or access the VEGETABLE files as fast as possible. In the typical master CD manufacturing process the files would be burned into the master CD in the order listed in List 2. In this case, the VEGETABLE files would be installed toward the inner portion of the master CD, since they are near the top of the list. Since it is desired to access these files as rapidly as possible, the VEGETABLE files should be burned in after all the other files have been burned into the master CD. In addition, to maximize performance, it is desired to locate all of the files toward the outermost portion of the master CD. This can be done by burning in a dummy file prior to burning the files in List 2. The size of the dummy file can be calculated using equations 1 and 2 above, with other considerations for various overhead requirements dependent on the particularities of data on the CD (e.g., mixed audio/video and data tracks, multiple sessions, etc.).

Figure 2:
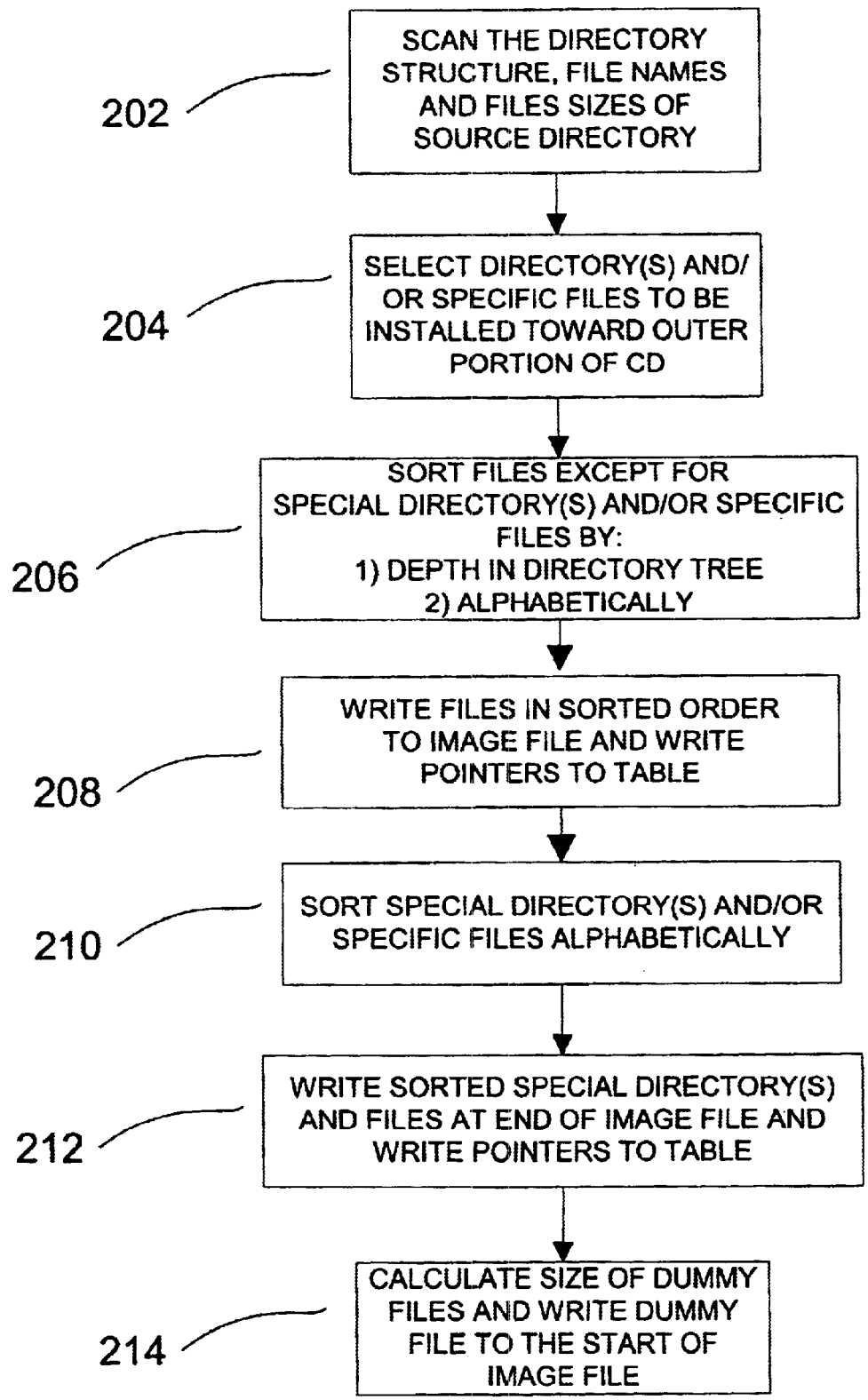
FIG. 2 is a flowchart comprising steps for creating a CD image file.

FIG. 2 contains a flowchart comprising the steps discussed above for creating an image file that can then be written to a master CD. In step 202, a scan is made of the directory structure, including file names and sizes from a source directory. This will provide a file/directory listing similar to that shown in list 1. In step 204, directories and/or files are selected to be installed toward the outer portion of the CD. This could be done either by a user, or alternately, by a computer program. For instance, it may be desired to put .EXE files or files with other common filename extensions (the file extension is indicative of the type of data stored in the files, i.e., executable, text file, etc) at predetermined locations relative to other types of files on the master CD. A predetermined selection order could be written into a computer program to automatically select certain file types, or selections based on various criteria. Additionally, the files could be selected by a user using a user-interactive program that would select the files and directories in response to a user's input. In step 206, all the files except for those selected in step 204 are sorted by (1) depth in the directory tree, and (2) alphabetically. This is an exemplary scheme for sorting the non-selected files; other alternate schemes may also be employed, such as sorting the files by file hierarchy tree branch levels from the top of the tree towards the bottom. In step 208, the files sorted in step 206 are written in a sorted order to an image file. In conjunction with this step, a pointer table is created that contains pointers to the written files. The pointers in the table contain the starting sector of the files on the CD, while also containing information on where the files are to be installed within the directory structure on the CD-ROM.

After the non-selected files have been sorted and written to the image file, the files and directories selected in step 204 are sorted, as shown in step 210. The ideal sort order will be one that minimizes seeks during install and/or during program installation. These files could also be sorted by other schemes. After the selected files or directories are sorted, they are written (appended) to the end of the image file, and in addition, their location information is written to the pointer table. This is shown in step 212. Finally, in step 214 the size of a dummy file is calculated as discussed above, and the dummy file is written so that it is at the start of the image file. Ideally, the dummy file does not show up in the list of files, but rather resides as a hidden file that has a sole purpose of occupying space. The entire image file can then be burned into a master CD, resulting in the master CD having the dummy file located toward the innermost portion of the disc, while the selected files in step 204 are located toward the outermost portion of the disc, with the non-selected files located somewhere in-between. The size of the dummy file may be reduced to ensure that selected data files are at or near the location of the maximum expected data transfer rate on the optical disc. For example, if the optimal data transfer location is inside the outer edge of the disc as explained further below, then the dummy file size may be reduced by an offset that will place the selected files at or near the optimal location.

Exemplary Implementation 2

Figure 3:
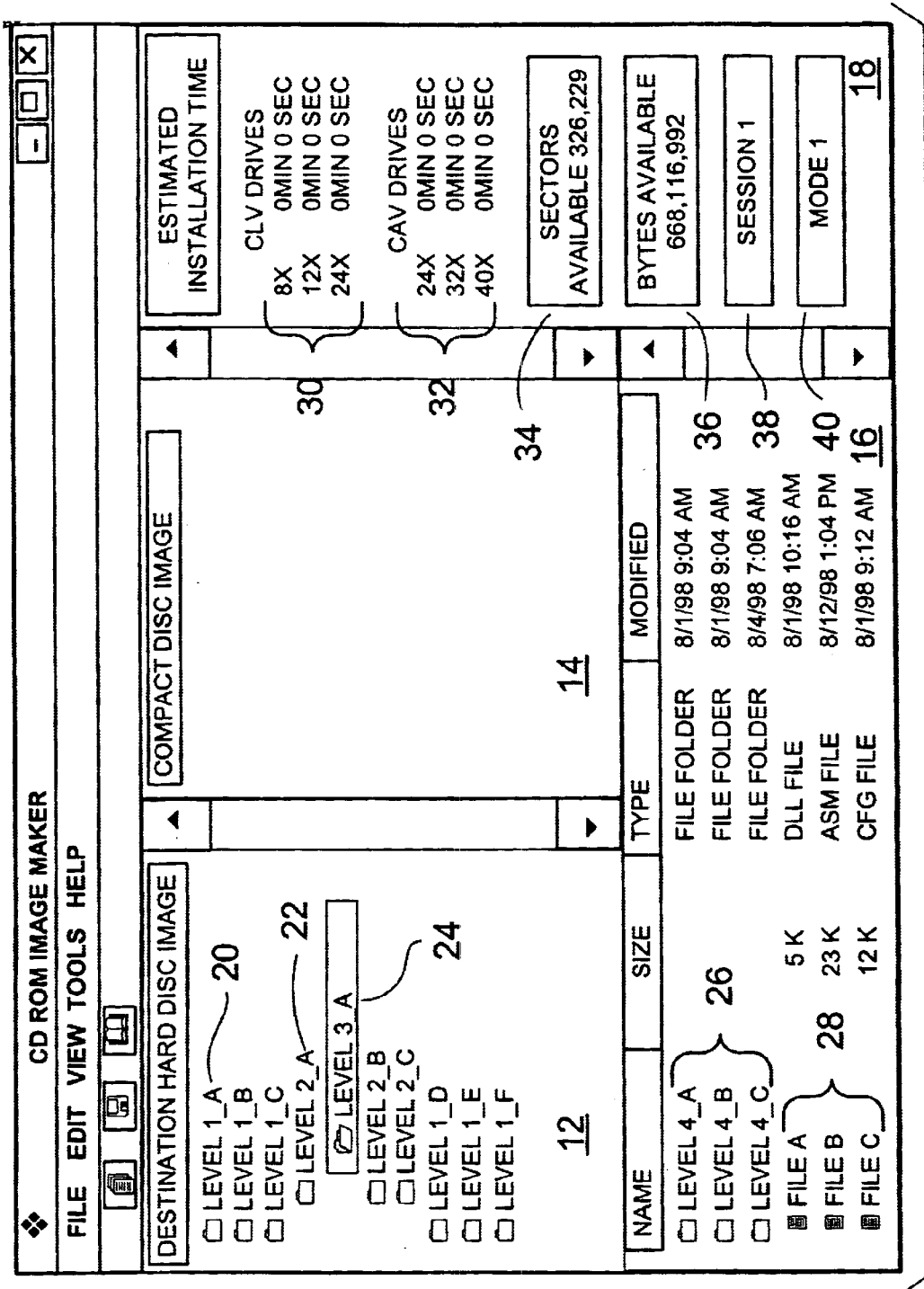
FIG. 3 is a diagram illustrating an example of a user-interface of a computer program for user-interactive control of the placement of files on a CD-ROM.

FIG. 3 shows a window-based user interface for a user-interactive computer program implementation of the invention. Window Frame 10 comprises a source and destination file hierarchy tree pane 12, a compact disc (CD) image file order list pane 14, a file detail pane 16, and a statistics pane 18. The source and destination file hierarchy tree pane 12 comprises file folder icons of various nested directory levels, including file folder 20 at level 1, file folder 22, at level 2, and file folder 24, at level 3. The file detail pane 16 comprises information pertaining to a selected file folder from either the file hierarchy tree pane 12 or the image file order list pane 14. For example, in FIG. 3 file folder 24 is selected. The contents of file folder 24 are displayed in file detail pane 16, including nested file folders 26 and individual files 28. Statistics pane 18 displays several pieces of statistical information, including CLV CD-ROM drive estimated installation times 30, CAV CD-ROM drive estimated installation times 32, sector availability display frame 34, byte availability display frame 36, section display frame 38, and mode display frame 40.

The file hierarchy tree pane 12 reflects the file and directory structure (file hierarchy tree) that will be present when the application program and associated files are installed from the CD onto the destination drive, such as a computer's hard disc. The file hierarchy tree can be built from pasting (or dragging) files or directories from any available local or networked storage device using conventional tools such as the "WINDOWS EXPLORER" file management program in the Windows NT® operating system. Alternatively, a source directory can be selected at program startup. This source directory is located on a local or networked hard discs and contains the desired CD-ROM files and directory structure.

Figure 4:
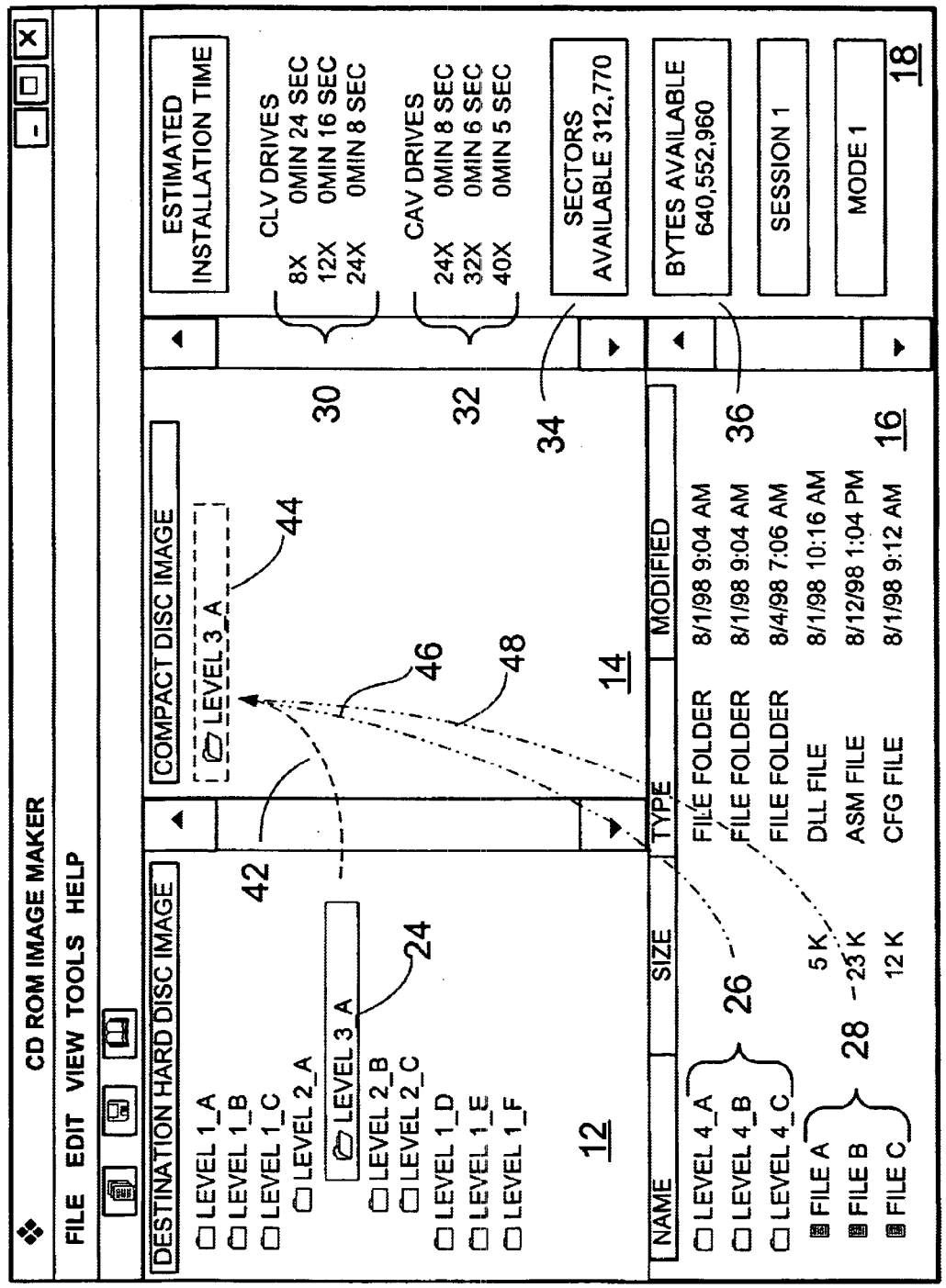
FIG. 4 is a diagram illustrating how the program shown in FIG. 3 moves a file folder.

To add files to a master CD image file order list, a user selects a file folder (at any level) from the file hierarchy tree pane 12 or individual file(s) from the file detail pane 16, and drops or pastes the selected file folder or selected file(s) into the image file order list pane 14. FIG. 4 graphically shows an example of this. In FIG. 4, file folder 24 is selected and a copy of it is dragged into image file order list pane 14 as shown by path 42. File folder 44 is a mirror image of file folder 24. Only copies of the file folders are inserted into the file hierarchy tree—the original source and destination file hierarchy structure remains unchanged. When file folder 24 is inserted into the CD image file order list all of the subdirectory folders and files are also transferred. Thus, file folders 26 and files 28 are shown moving into file folder 44 along phantom lines 46 and 48, respectively.

When files are copied into the image file order list pane 14, several events occur in synchrony. The CLV CD-ROM drive estimated installation time values 30 are recalculated and displayed, the CAV CD-ROM drive estimated installation time values 32 are recalculated and displayed. Additionally, the "sectors available" display frame 34 is updated to display the maximum number of sectors available for additional files, and the bytes available display frame 36 is updated to display the maximum number of bytes available for additional files.

Figure 5:
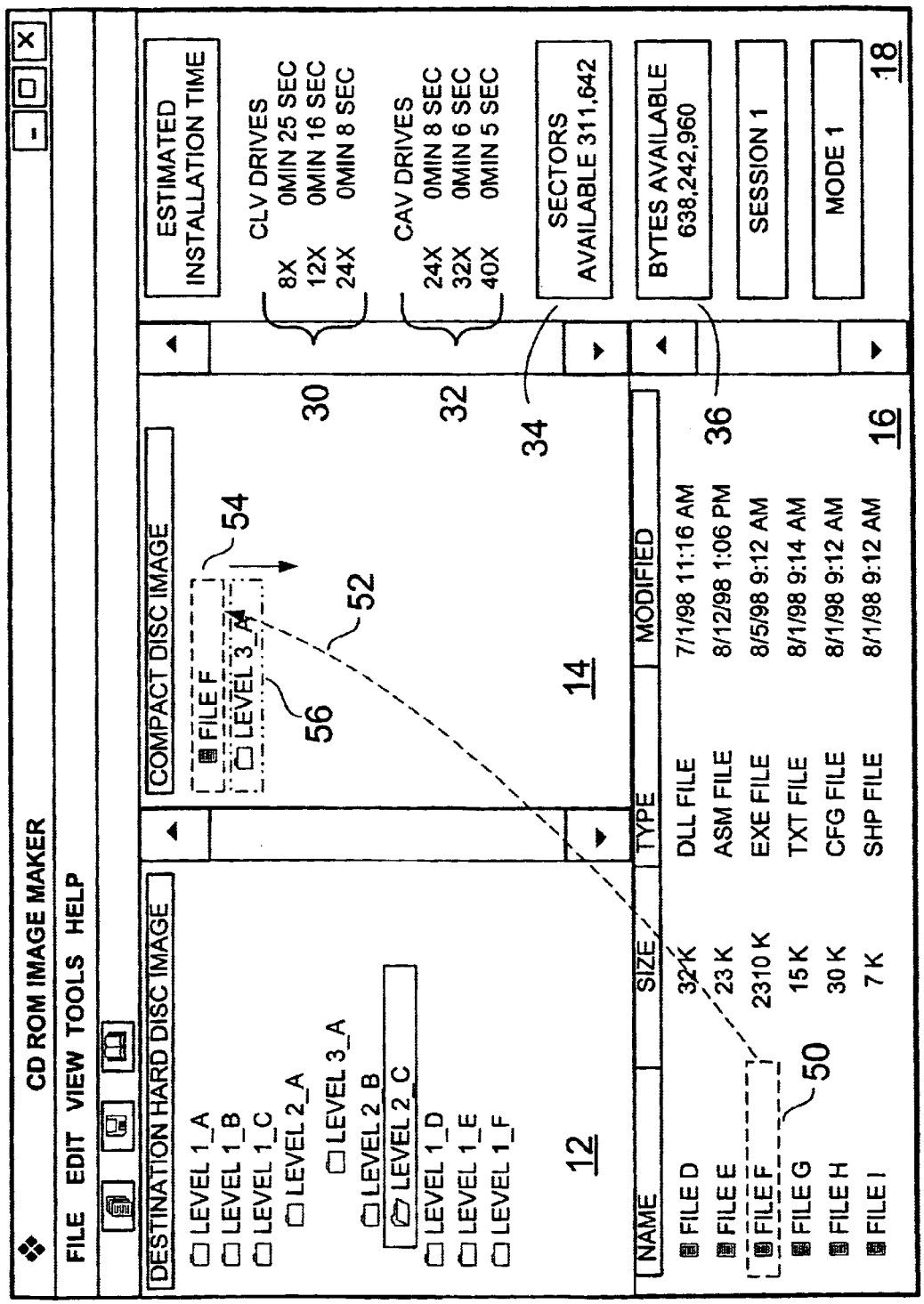
FIG. 5 is a diagram illustrating how the program shown in FIG. 3 moves a single file.

FIG. 5 graphically illustrates a similar sequence of events that occur when an individual file is added to the image file order list pane 14. In this instance, File F is copied from selection box position 50 in the detail file frame 16 along path 52 to selection box position 54 in the image file order list pane 14. Since file F was positioned above file folder LEVEL 3_A, this file folder is moved down in the hierarchy to position 56. In synchrony, The CLV CD-ROM drive estimated installation time values 30 are recalculated and displayed, the CAV CD-ROM drive estimated installation time values 32 are recalculated and displayed, the sectors available display frame 34 is recalculated and displayed, and the bytes available display frame 36 is recalculated and displayed.

Figure 6:
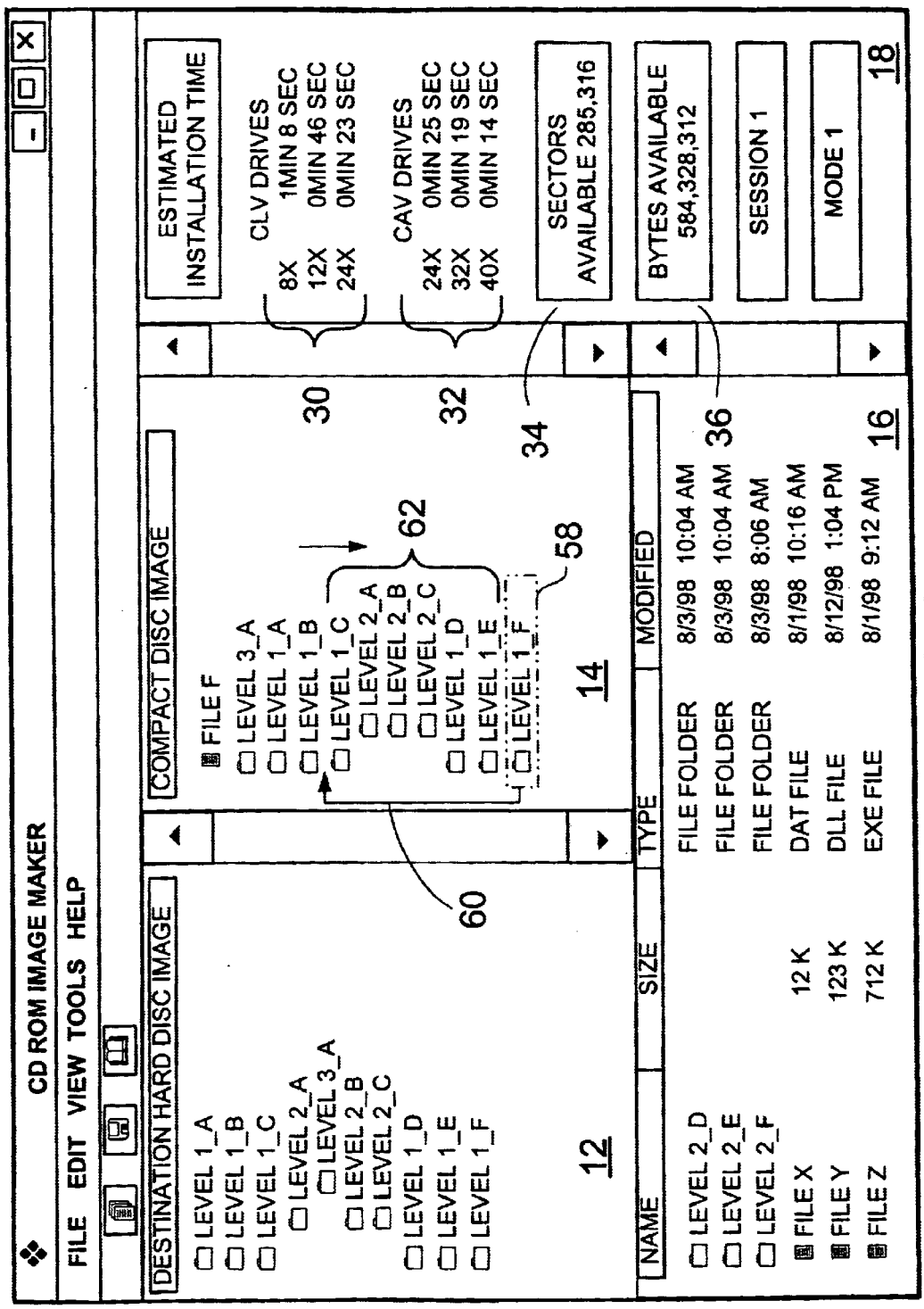
FIG. 6 is a diagram illustrating how the program shown in FIG. 3 can be used to modify a file hierarchy tree structure.

Another way of arranging the image file order list is illustrated in FIG. 6. By using this method, the order of the files on the image file order list pane 14 can be moved by dragging and dropping them above or below existing files or file folders. For example, FIG. 6 shows the order of the files when the user has chosen to move the file folder LEVEL 1_F at position 58 along path 60. This would place file folder LEVEL 1_F above all of the files in file group 62, which would be moved down in the file hierarchy tree image.

Figure 7:
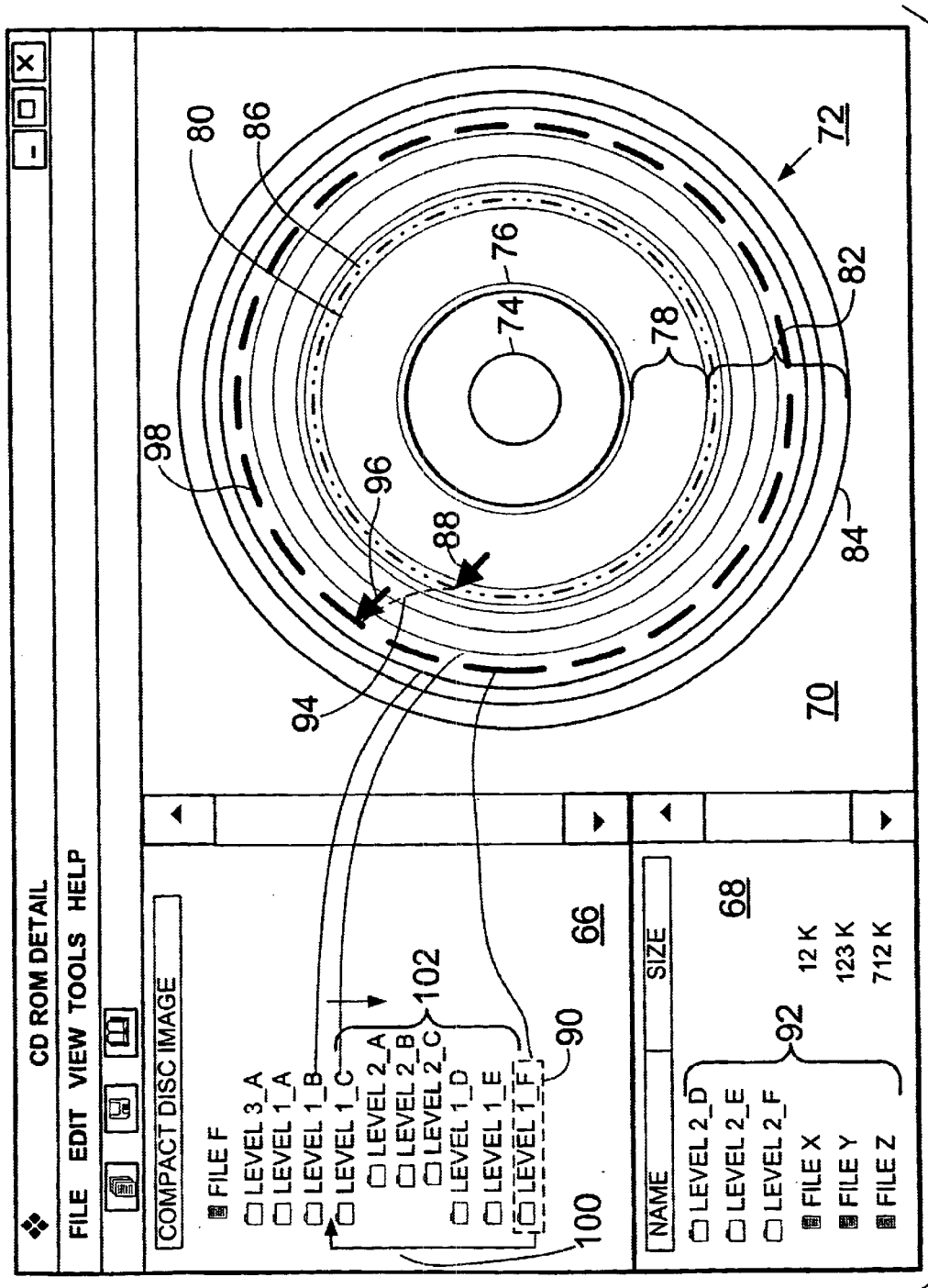
FIG. 7 is a diagram illustrating an optional user-interface for the program shown in FIG. 3.

An alternate interface for moving files and directories within the file hierarchy tree is shown in FIG. 7. FIG. 7 illustrates a window frame 64 comprising an image file order list pane 66, a file detail pane 68, and a virtual CD pane 70. The virtual CD pane 70 contains a virtual representation of a master CD 72, which graphically shows where files and directories will be located on a master CD once the master CD is made. There is no data stored between the center hub 74 and the data start ring 76. Area 78 represents the data storage area from the data start ring 76 to the first data file 80. The area 78 is where a dummy file would be located. Area 82, between the first data file 80 and the outer ring 84, is where the data and audio/visual files would be located. The various other rings represent the locations of various files and directories.

The file folder movement in FIG. 7 is similar to that shown in FIG. 6. In the FIG. 7 user-interface the user can either select a file or files or a directory (file folder) and drag it to a desired location in the image file order list pane 66 (similar to the steps discussed above regarding FIG. 6), or the user can optionally select a ring with the mouse cursor and drag it to a new position on the virtual master CD 72. If the user moves a file in the image file order list pane 66, the virtual master CD 72 may be modified in real-time to graphically illustrate the movement of the file by highlighting and increasing or decreasing the diameter of the ring associated with the file as the file is being moved. If the user chooses to move a ring (which represents a file or files or a directory and its associated files), the depiction of the selected ring will be changed by, e.g., changing its line type or its color. As the user drags the mouse the size of the ring will change to reflect its new location on the master CD. As an option, the file hierarchy tree in the image file order list pane 66 may be updated to reflect the movement of the selected file or directory in real-time.

FIG. 7 portrays an example of moving a file folder on the virtual master CD 72. The user clicks on ring 86 at cursor location 88, selecting file folder LEVEL 1_F, as shown at position 90. Upon selecting the file folder, file folder details 92 are updated in the file detail pane 68. The user drags the mouse cursor along path 94 to cursor location 96, with the new position of the ring being shown by highlighted ring 98. Concurrently, the file folder LEVEL 1_F is moved from position 90 upward along path 100, placing the file folder LEVEL 1_F above file folder LEVEL 1_C, and moving all the files in the group 102 down in the file hierarchy tree image.

Once the desired CD image file order list is built, the user can choose to create a master CD. When this is done the program first calculates the size of the dummy file as discussed above. This dummy file is then added to the CD-image file. The files in the image file order list pane are then added to the CD-image file in reverse order, from the bottom of the file list toward the top. The CD-image file is then burned into the master CD using a CD mastering apparatus.

The virtual image writing method can also be used. In this method the files are directly burned into the master CD from the CD-image file order list without creating a CD-image file. As with the CD-image file writing method, the first file burned into the master CD is the dummy file. The files in the CD-image file order list are then written to the master CD from the bottom of the list toward the top so that the topmost file is written at the outermost portion of the master CD. Manufactured quantities of the application program can then be mass produced from the master CD.

Calculating the Estimated Installation Times

The estimated times for installation of the image files shown in the destination file hierarchy tree 14 are recalculated and displayed whenever a change is made to the image file order list. This is performed for both CAV and CLV drives. Equations 3 and 4 can be used to calculate the estimated installation time for each individual file:

$$\text{Est. Time/File} = \frac{\text{File Size(bytes)}}{\text{Rated transfer rate(bytes/sec)}} \times \frac{CD \text{ Radius}}{\text{Ave Readhead Radial Position}} \quad (3)$$

where $$\frac{CD \text{ Radius}}{\text{Ave Readhead Radial Position}} = \frac{\text{Maximum\# Sectors Available}}{(\text{File Sector Start\#} + \text{File Sector End\#}/2)} \quad (4)$$

For CLV drives, the radial position of the read-head is irrelevant, so equation 4 always equals 1. Equation 5 can then be used to calculate the total estimated time for installing all of the files:

$$\text{Total Est. Time} = \sum_{File0}^{FileN} \text{Est. Time/File} + \text{Estimated Overhead Time} \quad (5)$$

In equation 5, File 0 is the dummy file, and the estimated overhead time will depend on several factors, including the directory structure, number of files to be installed, and number of sessions on the CD. This estimated overhead time will generally be less than 10% of the total installation time, and may be derived from empirical data using various CLV and CAV CD-ROM drives.

Additional Considerations

As noted above, the access or seek time for a CD-ROM drive is much more significant than the access time for a hard disc. Thus, files should be ordered so that when the program and data files are written to a destination drive there is a minimal amount of time required for seeking the files. For example, it is preferable to have the order of the files on the CD-ROM be similar to the order of the files in the destination drive file hierarchy. This is because when the files are written to the destination drive it is preferable to write them in their file hierarchy order, although this is not a strict requirement. When files are ordered in this manner the seek times are minimized because the files are physically located near one another on the CD-ROM, thereby requiring the read-head to traverse a minimal distance to locate and read all of the files during program installation.

Another consideration is that the maximum data transfer rate for a particular CD-ROM or drive may not be at the very outside of the disc. This is usually caused by manufacturing imperfections in the CD, or may be due to the lower performance characteristics of less-expensive drives. Manufacturing imperfections may lead to wobble or similar phenomenon that is more pronounced toward the outside of the disc. CD-ROM drives have special circuitry to compensate for such problems, but the processing speed of the circuitry may limit the maximum data transfer rate, especially in less-expensive drives. Furthermore, the accuracy of the spindle bearing in the CD-ROM drive may effect the maximum transfer rate of the drive when reading non-perfect CDs.

Figure 8:
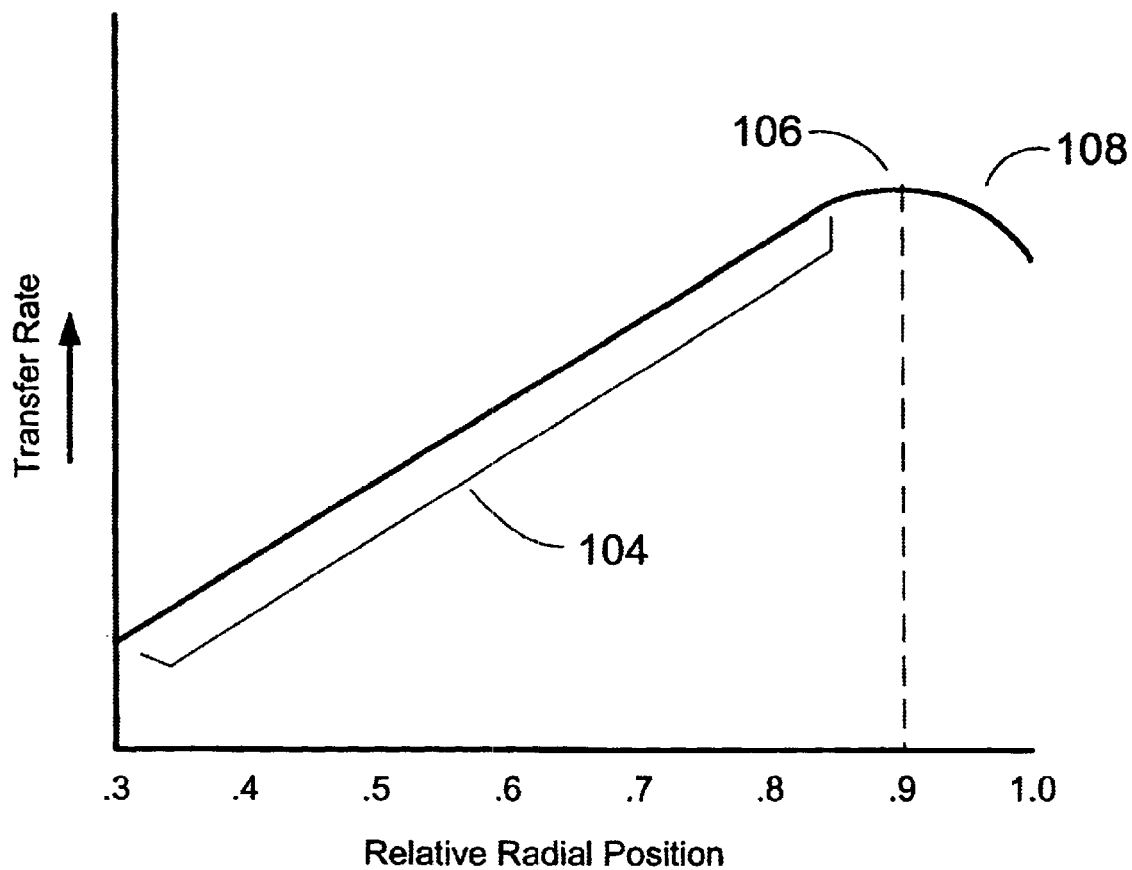
FIG. 8 is a graph depicting the data transfer rate of an exemplary CAV CD-ROM drive as a function of the relative radial position of data on a CD-ROM.

FIG. 8 depicts an exemplary overall performance graph generated by a statistical analysis of data transfer rates produced by CAV CD-ROM drives from either a single or multiple manufactures. The graph shows the relation between the data transfer rate and the relative radial position of the data on the CD, with a maximum value of 1.0 representing a radial position at the very outside of the disc. The relationship is linear throughout range 104, which is what would be expected since the read-head velocity is linearly proportional to the radial position on a CAV drive. However, the linear relationship starts to lessen as the outside of the disc is approached, reaching a maximum at peak 106. The data transfer rate actually starts to decrease towards the very outside of the disc, as depicted by 108.

Data similar to that shown in FIG. 8 could be used to rearrange the order of the image file order list so that the files and/or directories at the top of the list (those with the highest priority) are burned into the Master CD so as to be located at a relative radial position that corresponds to the peak transfer rate 106. In this instance the relative radial position would be about 0.9. Files near (but not at) the top of the list could be alternately located on both sides of the peak. By knowing the size of the files to be written to the Master CD, the files in the CD image file could be ordered so that the files at the top of the CD image file order list would be positioned nearest the peak transfer rate position on the disc.

Conclusion

While the invention is described in the context of specific implementations, the scope of the invention is not limited to these implementations. For example, while one implementation described above discusses the use of a dummy file to locate data optimally on an optical disc, the use of a dummy file is not required. The calculations used to compute the size of the dummy file may also be used to compute the regions of used and unused portions of the disc without actually using a dummy file to occupy the unused portion. The disc location indicating the point between used and unused portions may be stored as an optimal location parameter and used in conjunction with software for controlling the transfer of data on a disc to define the region where useful data should be stored.

The above examples illustrate a variety of graphical user interfaces for locating files on a disc. Many variations to these user interfaces are possible. For example, a number of the graphical features illustrated above may be used alone or in combination with other features to create different graphical user interfaces.

In view of the many possible embodiments to which the principles of the invention may be applied, it should be recognized that the illustrated implementations are only examples of the invention and should not be taken as a limitation on the scope of the invention. Rather, the scope of the invention is defined by the following claims. I therefore claim as my invention all that comes within the scope and spirit of these claims.

I claim:

1. A method for producing an optical media disc that stores data readable by a computer via an optical media drive, the method comprising:

organizing the data based on an order in which the data will be accessed on the optical media disc and a desired potential data transfer rate from the optical media drive, including designating a portion of the data to be transferred from the optical media disc at a data transfer rate higher than other data;

transferring the data into a master optical media disc so that the portion of the data is located at a position on the disc with a higher expected data transfer rate than the other data;

selecting files in an image file list to have a higher data transfer rate when the optical media disc is being read by a CAV optical media drive than unselected files; and calculating a size of a dummy file to be transferred onto the master optical media disc toward an inner portion of the disc so that the selected files are located at an outer portion of the disc where data transfer rates are higher than the inner portion of the disc.

2. The method of claim 1 wherein the selected files are selected in response to a user-input to a computer program for organizing files in the image file list.

3. The method of claim 1 wherein the selected files are selected by a computer program based on pre-determined criteria.

4. The method of claim 1 wherein selecting the files includes:

determining most-frequently accessed files by statistical analysis; and organizing the files in the image file list so that the most frequently accessed files have the higher data transfer rate.

5. The method of claim 1 wherein the image file list has a top and a bottom, and the files in the list are ordered so that the selected files are located toward the top of the list, and wherein the files in the list are sequentially transferred into the master optical media disc in order from the bottom of the list toward the top of the list, the files being transferred from the inner portion of the master optical media disc toward the outer portion of the master optical media disc.

6. A computer-implemented method for producing an optical media disc that stores computer readable files installable to a computer readable disc: drive via a CAV optical media drive, the method comprising the steps:

building an optical media disc image file order list of the computer-readable files;

transferring a dummy file into a master optical media disc so that the dummy file is located toward the inner portion of the optical media disc;

transferring the computer-readable files of the optical media disc image order list into the master optical media disc so that the computer readable files are located toward the outer portion of the master optical media disc; and duplicating the master optical media disc to produce the optical media disc.

7. The method of claim 6 wherein the optical media disc has a predetermined storage capacity, the computer readable files each have a predetermined storage size, and the dummy file has a storage size, the storage size of the dummy file being calculated by:

calculating a cumulative storage size required to store all of the computer readable files based on the total of the predetermined storage sizes of each of the files;

calculating an overhead storage size based on the optical media disc image file order list; and calculating the storage size of the dummy file by subtracting the cumulative storage size and the overhead storage size from the predetermined storage size of the optical media disc.

8. The method of claim 6 comprising:

selecting files or directories from the optical media disc image file order list to have a higher data transfer rate when the optical media disc is being read by a CAV optical media disc drive than unselected files; and transferring the selected files or directories to the master optical media disc so that these files are located so as to optimize the data transfer rate when the files are read by a computer.

9. The method of claim 8 wherein the location of the selected files or directories is toward the outermost portion of the master optical media disc.

10. The method of claim 8 wherein the selected files or directories are selected in response to a user-input.

11. The method of claim 8 wherein the selected files or directories are selected by a computer program based on pre-determined criteria.

12. The method of claim 8 including:

determining most-frequently accessed files by statistical analysis; and organizing the files in the image file list so that the most frequently accessed files have the higher data transfer rate.

13. The method of claim 8 wherein the files are ordered in the optical media disc image file order list so as to minimize optical media seek times during installation.

14. The method of claim 13 wherein the order and frequency of file access during installation is determined by statistical analysis of file access data generated from previous installations of the computer readable files.

15. The method of claim 8 wherein the optical media disc image files order list has a top and a bottom, the files in the list being ordered so that the selected files are located toward the top of the list, and wherein the files in the list are sequentially transferred to the master optical media disc in order from the bottom of the list toward the top of the list, the files being transferred from the inner portion of the master optical media disc toward the outer portion of the master optical media disc.

16. The method of claim 8 wherein the computer readable files include an application program that comprises required and optional program files, and the selected files are the required program files.

17. The method of claim 8 Wherein the computer readable files include an application program that comprises installed files that are installed on the fixed-media drive and are accessible from the fixed-media drive when the application program is being run on a computer, and read-only files that are accessed from the optical media disc during program usage, and wherein the selected files are the read-only files that are most-frequently accessed during program usage.

18. The method of claim 17 wherein the most-frequently accessed files are determined by statistical analysis.

19. The method of claim 8 comprising:

creating an installation program that comprises a file/directory table, the installation program having instructions for installing the program or data files to a fixed-media drive so that they are structured in a pre-determined file hierarchy.

20. A computer-implemented method for producing an optical media disc that stores files readable by a computer via a CAV optical media disc drive, the method being implemented on a computer having a display device, the method comprising the steps:

building an optical media disc image file order list comprising the computer readable files;

displaying the optical media disc image file order list;

in response to user input, selecting files or directories from the displayed list to have a higher data transfer rate than the unselected files or directories; and controlling transfer of the files of the optical media disc image file order list into a master optical media disc so that the specifically-selected files are located so as to maximize their data transfer rate when being read by the computer.

21. The method of claim 20 wherein the optical media disc image file order list has a top and a bottom, the optical media disc image file order list being rearranged so that the selected files are located at the top of the list, and wherein the files are sequentially transferred into the master optical media disc in order from the bottom of the list toward the top of the list, the files being transferred from the inner portion of the master optical media disc towards the outer portion of the master optical media disc.

22. The method of claim 20 wherein the files comprise required and optional files, and the selected files are the required files.

23. The method of claim 20 wherein the files include an application program with installed files that are installed on a fixed-media drive and accessible from the fixed-media drive when the application program is being run on a computer, and read-only files that are accessed from the optical media disc during program usage, the selected files being the read-only files that are most-frequently accessed during program usage.

* * * * *

UNITED STATES PATENT AND TRADEMARK OFFICE
CERTIFICATE OF CORRECTION

PATENT NO. : 6,693,869 B1
DATED : February 17, 2004
INVENTOR(S) : Joseph C. Ballantyne It is certified that error appears in the above-identified patent and that said Letters Patent is hereby corrected as shown below:

Column 4,
Line 42, "up.data" should read -- up data --.

Column 7,
Line 65, "2352." should read -- 2352 bytes --.

Column 8,
Line 3, "304" should read -- 304 bytes --.

Column 11,
Line 60, should read -- C:\PROCHEF\APPETIZER\MEATS\FISH\SALMON.DAT --.

Column 18,
Line 64, "disc:" should read -- disc --.

Column 20,
Line 8, "Wherein" should read -- wherein --.

Signed and Sealed this

Fourth Day of April, 2006

JON W. DUDAS
*Director of the United States Patent and Trademark Office*